United States Patent [19]

Fukanaga

[11] 3,851,145

[45] Nov. 26, 1974

[54] MICRO-MINIATURE SOLDER IRON

[76] Inventor: Akio Fukanaga, 2055 Colby Ave., Los Angeles, Calif. 90025

[22] Filed: Mar. 26, 1973

[21] Appl. No.: 344,919

[52] U.S. Cl. ................... 219/236, 219/229, 228/54
[51] Int. Cl. ........................... H05b 1/00, B23k 3/04
[58] Field of Search .................. 219/221, 227–242; 228/51–55

[56] References Cited
UNITED STATES PATENTS

| | | | |
|---|---|---|---|
| 2,547,437 | 4/1951 | Bunts et al. | 219/236 X |
| 2,714,651 | 8/1955 | Wotton | 219/239 |
| 2,758,191 | 8/1956 | Bell | 219/221 |
| 3,121,781 | 2/1964 | Schoenwald | 219/237 |
| 3,245,599 | 4/1966 | Johnson | 219/229 UX |

FOREIGN PATENTS OR APPLICATIONS

| | | | |
|---|---|---|---|
| 1,101,642 | 3/1961 | Germany | 219/236 |

Primary Examiner—A. Bartis
Attorney, Agent, or Firm—Henry M. Bissell

[57] ABSTRACT

A micro-miniature soldering iron in which a fine copper wire rod is swage fitted into a hollow stainless steel tube having an outside diameter not greater than .025 inches. The copper rod has a forward end terminating in a bevel-shaped working end surface flush with the end of the support tube and with the support tube totally enveloping all portions of the rod except for the exposed shaped working end surface which is adapted to be completely covered by solder when in use. An electric heating coil disposed in the support tube adjacent to the rear end of the rod provides heat for soldering. The bevel-shaped working end surface may be bevelled to any desired angle in accordance with the size of the object to be soldered.

10 Claims, 3 Drawing Figures

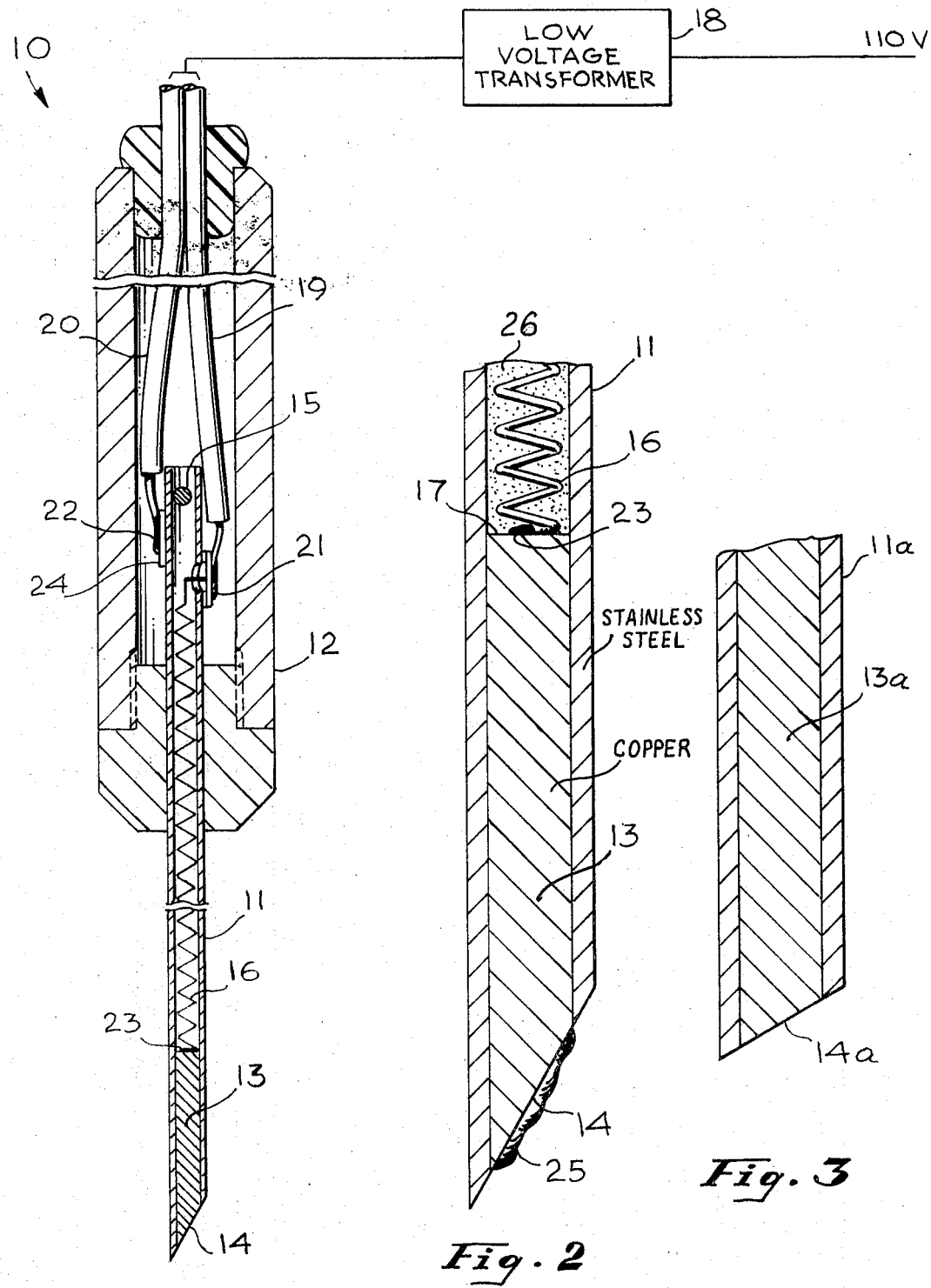

MICRO-MINIATURE SOLDER IRON

BACKGROUND OF THE INVENTION

1. Field of the Invention

This invention relates to soldering irons and more particularly to a micro-miniature soldering iron for use in applications such as printed circuit modules requiring extremely tiny working tools.

2. Description of the Prior Art

Miniature soldering irons require the solder tip to be made of a good heat conductive material such as relatively pure copper. Such material is continually subjected to the heat of the iron during operation and is particularly vulnerable to contact with air and consequent oxidation thereby especially due to its small size. Larger soldering tips typically develop surface irregularities of .010 to .050 inch due to oxidation during use. These can be tolerated or even filed away in the usual applications where larger size irons are employed. However, the present micro-miniature soldering iron tip may have a diameter of less than .025 inch in order to be useful in micro-miniature circuit modules. It will be apparent that oxidation such as is encountered with larger-sized, more conventional soldering iron tips would totally destroy a micro-miniature tip of the size indicated if conventional structure were employed. In fact, it has been found that miniaturized soldering irons of construction comparable to known prior art soldering iron tips last less than one hour in normal use because of destruction from oxidation.

Applying the conventional techniques of larger size soldering irons in protecting the tip from air has not been successful in micro-miniature applications because of the different operational characteristics faced. For example, in the Patent to R. O. Johnson 3,245,599, there is disclosed a regular size soldering iron in which the soldering tip is protected by a stainless steel sleeve and a coating of iron electroplated on the tip. While such a device is acceptable for a large soldering iron, if the teachings of Johnson were applied to the design of a miniature soldering iron, the iron-plated tip would not produce sufficient heat and the cone-shaped configuration of the tip in Johnson would not be completely wetted since the solder must be applied from a single surface of the tip at a time. In the patent to Johnson the circular surface of the cone tip would not have solder on it all the time in a miniature application and therefore would be oxidized and thereby ruined in a short time.

A prior art miniature soldering iron such as taught in the Patent to Homebrecher 3,536,890 has a soldering tip which is completely exposed and therefore is only usable for a short time in miniature applications. Other devices known in the prior art have been wholly unsuccessful in attempts to adapt the art of regular size soldering irons to miniature soldering iron since the need for protecting the copper tip in miniature irons is extremely critical due to the small size of the copper solder tip.

Accordingly, it is an object of this invention to provide a micro-miniature soldering iron in which the solder tip is completely protected from exposure to air at all times during the soldering operation.

SUMMARY OF THE INVENTION

Briefly, the micro-miniature soldering iron of the present invention protects the soldering tip from oxidation by the use of a miniature hollow tube of oxidation-resistant material to envelop all of the portions of the solder tip except the working end surface which is particularly adapted to be covered by a protective film of solder. The working end surface is configured to have a single planar surface which is easily covered by solder because of its shape. According to one particular arrangement, a rod of high thermal conductivity is press-fitted into the bore of the hollow tube in such a manner as to be completely enveloped by the tube except for the working end surface. A heating coil is disposed in the tube adjacent to the rear end of the rod to provide a source of heat. The working end surface is bevelled at an angle in accordance with the degree of fineness required by the soldering application with the end of the tube shaped to conform with the bevel angle to prevent any exposure of the rod to air. In this manner, during operation, the solder tip is either enclosed by the support tube or covered by the solder and is therefore completely protected from oxidation. The present invention is especially directed to micro-miniature applications such as encountered in miniature electronic circuit board modules wherein minute amounts of solder are to be applied to or removed from surfaces which are not only of the order of thousandths of an inch in dimension but are often located in small spaces severely limiting the access space available to the soldering iron.

The solder tip of the present invention is particularly adapted to be fitted into a handle of a soldering iron and to be detachable therefrom. Additionally, the solder tip may be adjusted for different size applications by filing the rod at the working end surface thereof to selectively vary the bevel angle thereof.

As mentioned above, soldering irons in accordance with the present invention are specifically designed for and particularly adapted to use the micro-miniature circuit modules which require a soldering tip of minute dimensions for most satisfactory results. Thus, soldering iron tips in accordance with the present invention, in order to be effective as described, have a maximum outside diameter of .025 inch and, in some cases may be even smaller. In one particular aspect of the invention, micro-miniaturization is achieved by the use of a stainless steel hollow tube having an outside diameter of about .020 inch and a wall thickness of about .004 inch. A fine copper wire of about 0.12 inch in diameter is swaged into the forward end of the tube with a heating coil of Nichrome wire of .002 inch diameter disposed in the tube behind the copper wire.

DESCRIPTION OF THE DRAWINGS

A better understanding of the present invention may be had from a consideration of the following detailed description, taken in conjunction with the accompanying drawing, in which:

FIG. 1 is a longitudinal sectional view of a miniature soldering iron embodying the present invention, enlarged to show the structural details thereof;

FIG. 2 is an enlarged view of the soldering iron of FIG. 1 showing the working end surface of the solder tip; and FIG. 3 is another enlarged view of the working end surface of the solder tip of FIG. 1 showing the solder tip filed to a different bevel angle for use with finer work objects.

DESCRIPTION OF THE PREFERRED EMBODIMENT

In the drawing, a micro-miniature soldering iron indicated generally at 10 is shown and illustrated in FIG. 1 at approximately 10 times actual size to emphasize the micro-miniaturization of the art embodied herein. The soldering iron 10 has a soldering tip comprising a hollow support tube 11 having one end secured in a handle 12. The tube 11 is detachably supported in the handle 12 at 15 by a suitable clamp and release mechanism. The tube 11, in one embodiment, is approximately .020 inch in diameter with a wall thickness of approximately .004 inch and is made from high temperature metal such as stainless steel which is highly resistant to oxidation and to wetting from ordinary solder. The forward end of the support tube 11 is open to have a rod 13 adapted to be press-fitted or swaged in the bore of the tube 11. The rod 13 may typically be a fine copper wire of substantially pure copper and fits snugly in the tube 11, surrounded by the sleeve formed by the walls of the tube 11, having only a working end surface 14 that is exposed. The surface 14 inclines at a predetermined bevel angle, relative to the tube axis, such as illustrated in FIG. 1 with the edges of the support tube 11 conforming to the bevel angle of the surface 14. In this manner the surface 14 forms a single planar surface which serves as the only portion of the rod 13 which is not encased by the support tube 11. The surface 14 is prepared initially by filing and tinning and thereafter is completely covered by solder 25 during normal use. The combination of the solder 25 and the support tube 11 completely envelops and protects the rod 13 from exposure to air, thereby preventing or minimizing oxidation of the soldering tip during use. The single planar surface 14 offered for exposure to solder is all of the copper rod that is exposed to atmosphere, in contradistinction to prior art soldering tips of circular or other configuration, thus insuring that the working end surface will be completely covered by solder and the balance of the rod is encased by the support tube 11.

A miniature heating element shown in the preferred embodiment as a helical coil 16 is positioned in the support tube 11 adjacent to the rear end 17 of the rod 13. The coil 16 may be of conventionally fabricated Nichrome wire of approximately .002 inch in diameter, helically wound and stretched slightly. The remainder of the space in the support tube 11 surrounding the coil 16 may be filled with aluminum oxide insulation 26.

In one preferred embodiment, the coil 16 receives electrical power from an a-c source (not shown) through a standard low voltage transformer 18 and cables 19 and 20 which terminate in terminals 21 and 22. The terminal 21 is suitably connected to one end of the coil 16 and the terminal 22 and the other end of the coil 16 (the latter via the rod 13) are connected to the tube 11; at 23, for coil 16, and at 24, for terminal 22. The low voltage transformer 18 typically provides from 12 to 16 volts to the coil 16 from a standard 110 volt input. The voltage may vary according to the desired temperature to be achieved at the working end surface 14 which may be, for example, in the range of 300 to 700° F.

The electrical circuitry may be modified to provide a circuit wherein the heating coil 16 is insulated rather than grounded. In that event the terminals 21 and 22 would be suitably connected to respective ends of the coil 16 which would be wound on a core.

To provide more power and higher heat, a straight resistance wire with a larger diameter could be substituted for the helically wound coil 16.

As illustrated in FIG. 3, a modification of the device of FIGS. 1 and 2, the working end surface 14a may have a larger bevel angle relative to the tube axis than shown in FIG. 1. This modification may be readily accomplished by filing the surface 14 of FIG. 1 to achieve the more bevelled surface 14a of FIG. 3. The tube 11a is filed at its edges to conform with the angle of the surface 14a. The surface 14a presents a smaller size working surface which is more readily applied to finer work material.

This it may be realized from the foregoing description that the micro-miniaturized soldering iron of the present invention has not resulted merely from carrying forward or extending the application of an earlier idea by miniaturizing the design of known full size soldering irons. To the contrary, miniature soldering is achieved in a different manner with different structure which is particularly directed to solve the problem of oxidation which is so important in a miniature soldering iron.

Although there has been described above one specific arrangement of a miniature soldering iron in accordance with the invention for the purpose of illustrating the manner in which the invention may be used to advantage it will be appreciated that the invention is not limited thereto. Accordingly, any and all modification, variations of equivalent arrangements which fall within the scope of the annexed claims should be considered to be a part of the invention.

What is claimed is:

1. A soldering tip for use in a miniature soldering iron comprising:

a hollow support tube of stainless steel material open at its forward end;

a rod of copper wire swaged in the bore of said support tube, the dimensions of the support tube being such that the outside diameter of the soldering tip is not greater than .025 inch;

a heating element disposed in said tube adjacent the rod;

said rod having a rear end adjacent said heating element and a forward end terminating in a shaped working end surface, the side surfaces of said rod being completely encased by the forward end of said support tube, the shaped working end surface of the rod being flush with the open end of the support tube and being exposed through said open end.

2. A soldering tip according to claim 1 wherein the forward end surface of said support tube terminates in a shape to conform with the shape of the working end surface of said rod.

3. A soldering tip according to claim 2 wherein the working end surface of said rod is beveled.

4. A soldering tip according to claim 3 wherein the beveled working end surface of said rod provides a single planar surface particularly adapted to be covered by solder.

5. A soldering tip according to claim 1 wherein said tube is adapted to be detachably connected to a soldering iron handle.

6. A soldering tip according to claim 1 wherein said heater element comprises a helically wound coil having one end adapted to be connected to a source of electrical power and the other end connected to the rear end of the rod, and wherein the other end of the tube is adapted to be connected to the source of electrical power.

7. A soldering tip according to claim 1 wherein said support tube has an outside diameter of about .020 inch and a wall thickness of about .004 inch.

8. A soldering tip according to claim 7 wherein said rod is about .012 inch in diameter.

9. A micro-miniature soldering iron comprising:
a handle;
a soldering tip detachably supported in said handle;
said soldering tip having an outside diameter not greater than .025 inch and including a support tube of stainless steel material having a hollow bore open at the forward end thereof;
a rod of high thermal conductivity copper wire swaged into the open end of the bore of said support tube; and
a heating coil disposed in said support tube and adapted to be connected to an electrical power source for providing heat to said rod at the rear end thereof;
said rod having a forward end terminating in a shaped working end surface; and
said rod having its side surfaces totally encased by the forward end of said support tube, said shaped working end surface being flush with the forward end of the support tube and being exposed through the open end of the bore thereof.

10. A micro-miniature soldering iron according to claim 9 wherein the working end surface of said rod is beveled to provide a single planar surface adapted to be totally covered by solder, thereby preventing any portion of said rod from being exposed to atmosphere.

* * * * *